United States Patent [19]
Yeh

[11] Patent Number: 5,865,388
[45] Date of Patent: Feb. 2, 1999

[54] FISHING REEL WITH A BREAKING DEVICE

[76] Inventor: Shih-Yuan Yeh, No. 2-4, Chenghsing Rd., Taiping Hsiang, Taichung Hsien, Taiwan

[21] Appl. No.: 891,883

[22] Filed: Jul. 14, 1997

[51] Int. Cl.[6] .................................................. A01K 89/02
[52] U.S. Cl. .......................... 242/292; 242/245; 242/294; 242/316; 242/323
[58] Field of Search ..................................... 242/286, 290, 242/292, 294, 296, 323, 293, 316, 245

[56] References Cited

U.S. PATENT DOCUMENTS

| | | | |
|---|---|---|---|
| 2,059,519 | 11/1936 | Harris | 242/293 X |
| 2,929,579 | 3/1960 | Hull | 242/316 X |
| 2,932,464 | 4/1960 | Mauborgne | 242/245 X |
| 4,470,554 | 9/1984 | Kobayashi et al. | 242/245 |
| 4,520,971 | 6/1985 | Nagata | 242/292 X |
| 4,529,142 | 7/1985 | Yoshikawa | 242/292 X |
| 4,634,073 | 1/1987 | Coquelet | 242/245 |
| 4,676,451 | 6/1987 | Dispas | 242/245 |

*Primary Examiner*—Donald P. Walsh
*Assistant Examiner*—Emmanuel M. Marcelo
*Attorney, Agent, or Firm*—Foley & Lardner

[57] ABSTRACT

A fishing reel includes a spool rotatably mounted in a reel body and having two end portions each formed with a disk-shaped wheel. A supporting bracket is fixedly mounted on the reel body and includes an inner wall. A braking device is pivotally mounted in the supporting bracket and includes a first end portion formed with two braking arms each detachably abutting on the wheel of the spool and a second end portion extending outwardly from the supporting bracket. A torsional spring includes a first end urged on the inner wall of the supporting bracket and a second end urged on the second end portion of the braking device.

5 Claims, 5 Drawing Sheets

FISHING REEL WITH A BREAKING DEVICE

FIELD OF THE INVENTION

The present invention relates to a fishing reel, and more particularly to a fishing reel with a braking device.

BACKGROUND OF THE INVENTION

A conventional fishing reel is shown in FIG. 5 and an illustration will follow in the detailed description of the preferred embodiments.

The present invention has arisen to mitigate and/or obviate the disadvantage of the conventional fishing reel.

SUMMARY OF THE INVENTION

In accordance with one aspect of the present invention, there is provided a fishing reel which comprises a spool rotatably mounted in a reel body and including two end portions each vertically formed with a wheel to rotate therewith.

A supporting bracket is fixedly mounted on the reel body and includes an inner wall defining a space therein.

A braking device is pivotally mounted in the space of the supporting bracket and includes a first end portion formed with two braking arms each detachably abutting on the wheel of each of the two end portions of the spool, and a second end portion extending outwardly from the supporting bracket.

A torsional spring is mounted between the supporting bracket and the braking device and includes a first end urged on the inner wall of the supporting bracket, and a second end urged on the second end portion of the braking device.

Further features of the present invention will become apparent after a careful reading of the detailed description with appropriate reference to the accompanying drawings.

DETAILED DESCRIPTION OF THE PREFERRED EMBODIMENTS

Figure 5:
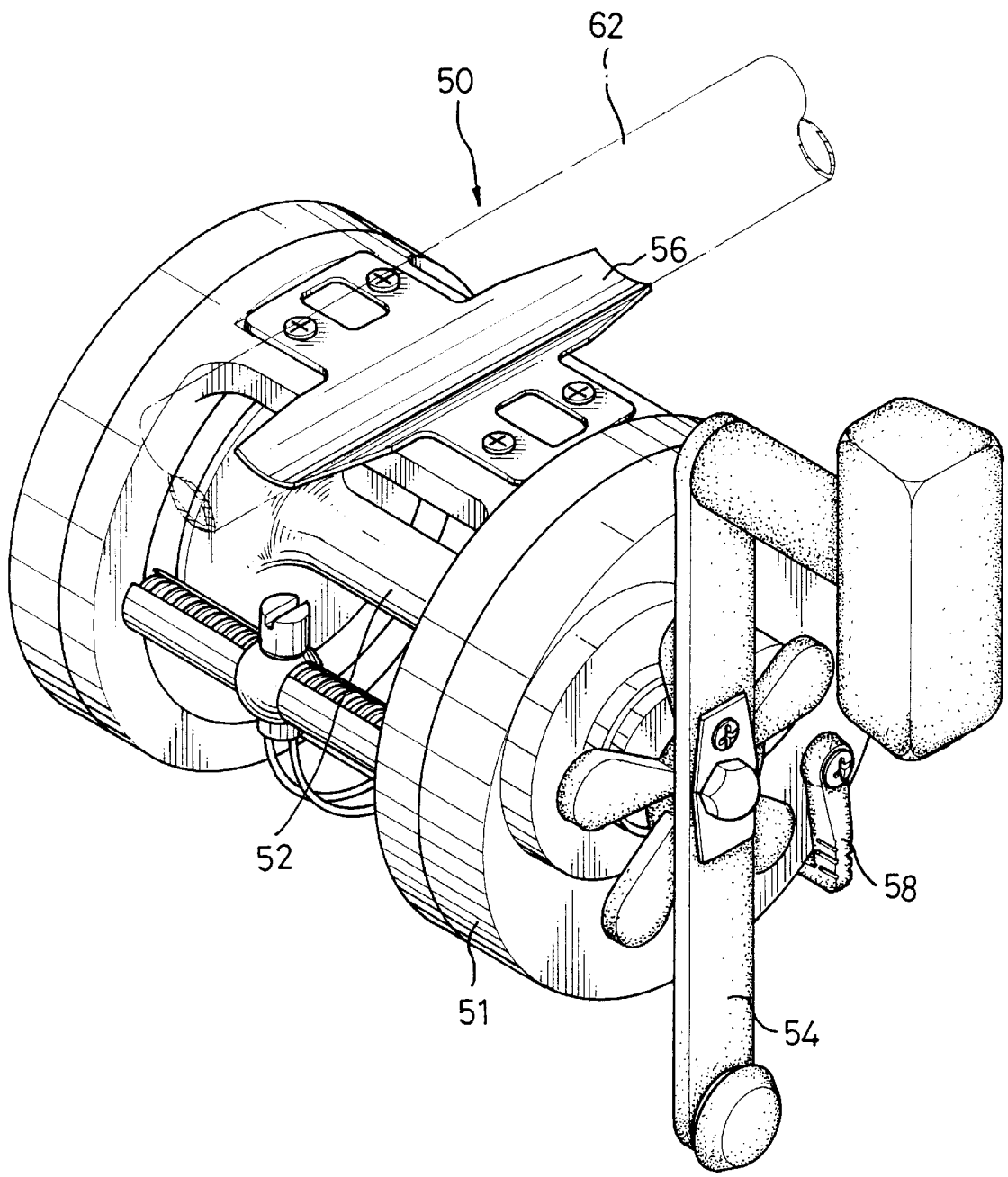
FIG. 5 is a perspective view of a conventional fishing reel in accordance with the prior art.

For a better understanding of features and benefits of the present invention, reference is now made to FIG. 5, illustrating a conventional fishing reel 50 according to the prior art.

The conventional fishing reel 50 includes a reel body 51, a spool 52 rotatably mounted in the reel body 51, a crank 54 rotatably mounted on the reel body for rotating the spool 52, an anti-reverse lock 58 for stopping the rotation of the spool 52, and a foot 56 mounted on the reel body 51 and engaged with a fishing rod 62.

The anti-reverse lock 58 can be rotated to a first position where the spool 52 can be rotated freely and to a second position where the rotation of the spool 52 can be stopped.

In operation, a length of fishing line (not shown) wound around the spool 52 and guided by the fishing rod 62 can be drawn downwardly by a sinker (not shown) so as to be deeply immersed into the sea until the sinker reaches a required depth in the sea.

When a user wishes to stop a further travel of the fishing line, the anti-reverse lock 58 can be rotated to its second position so as to stop the rotation of the spool 52. In such a situation, however, a great force will be exerted on the anti-reverse lock 58 due to the rotational velocity of the spool 52, thereby easily impairing the anti-reverse lock 58.

In addition, the foot 56 is easily detached from the fishing rod 62 due to a large force being exerted on the fishing rod 62 during fishing such that the reel body 51 will be detached from the fishing rod 62 and fall away, thereby easily damaging the reel body 51.

Referring now to FIGS. 1–4, a fishing reel according to the present invention can be adapted for a user to fish on the sea and comprises a spool 12 rotatably mounted in a reel body 10 and including two end portions each vertically formed with a wheel 122 to rotate therewith.

The reel body 10 includes two spaced apart cylindrical gear housings 11 each rotatably receiving the wheel 122 of each of the two end portions of the spool 12, and a plurality of connecting ribs 16 each axially connected between the two cylindrical gear housings 11. One of the ribs 16 defines a threaded hole 162 therein.

A crank 14 is rotatably mounted on one of the two gear housings 11 for rotating the spool 12 therewith, and an anti-reverse lock 18 is rotatably mounted on the gear housing 18 and can be rotated to a first position where the spool 12 can be rotated freely and is independent of the rotation of the crank 14 and to a second position where the rotation of the spool 12 can be stopped by the crank 14.

A supporting bracket 20 is fixedly mounted on the reel body 10 and includes an inner wall 21 defining a space 210 therein. The supporting bracket 20 includes a first end portion 22 abutting on the connecting rib 16 and defining a bore 222 aligning with the threaded hole 162, and a second end portion 23 defining an opening 230 therein.

A positioning bolt 42 extends through the bore 222 and is engaged in the threaded hole 162, thereby securing the supporting bracket 20 on the reel body 10.

An elevated lug 24 integrally protrudes upwardly from a top portion of the supporting bracket 20 and defines a passage 240 therein. An assembly rack 26 is fixedly mounted or integrally formed on a top portion of the elevated lug 24 and is located above the passage 240.

A braking device 30 is pivotally mounted in the space 210 of the supporting bracket 20 and includes a first end portion 31 formed with two braking arms 32 each having a braking pad 322 detachably abutting on the wheel 122 of each of the two end portions of the spool 12, and a second end portion 33 extending outwardly from the opening 23 of the supporting bracket 20.

A torsional spring 36 is mounted between the supporting bracket 20 and the braking device 30 and includes a first end 360 urged on the inner wall 21 of the supporting bracket 20 and a second end 362 urged on the second end portion 33 of the braking device 30. Preferably, a recess 34 is defined in a mediate portion of the braking device 30 for receiving the torsional spring 36 therein.

Figure 1:
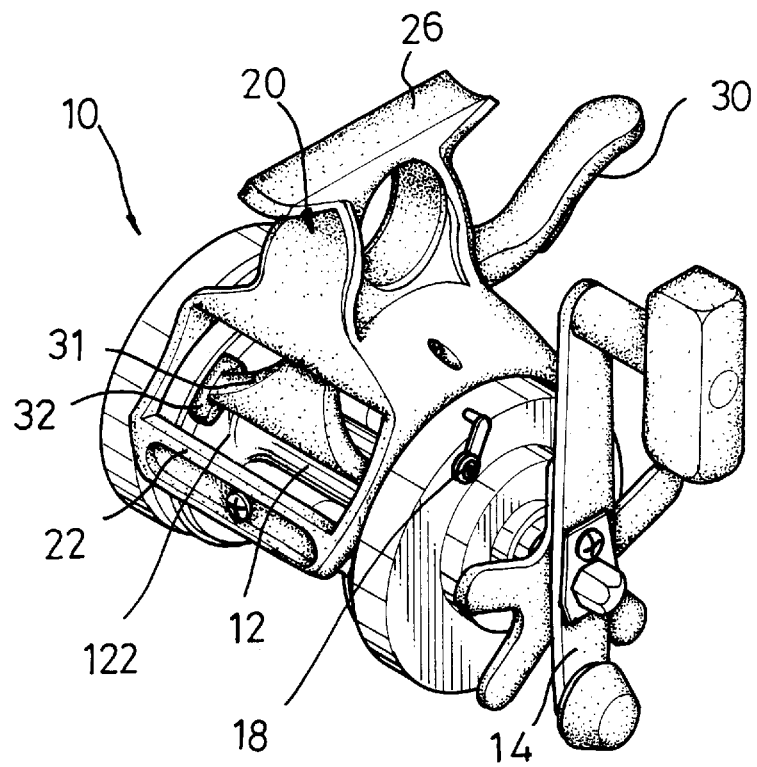
FIG. 1 is a perspective view of a fishing reel in accordance with the present invention.
Figure 2:
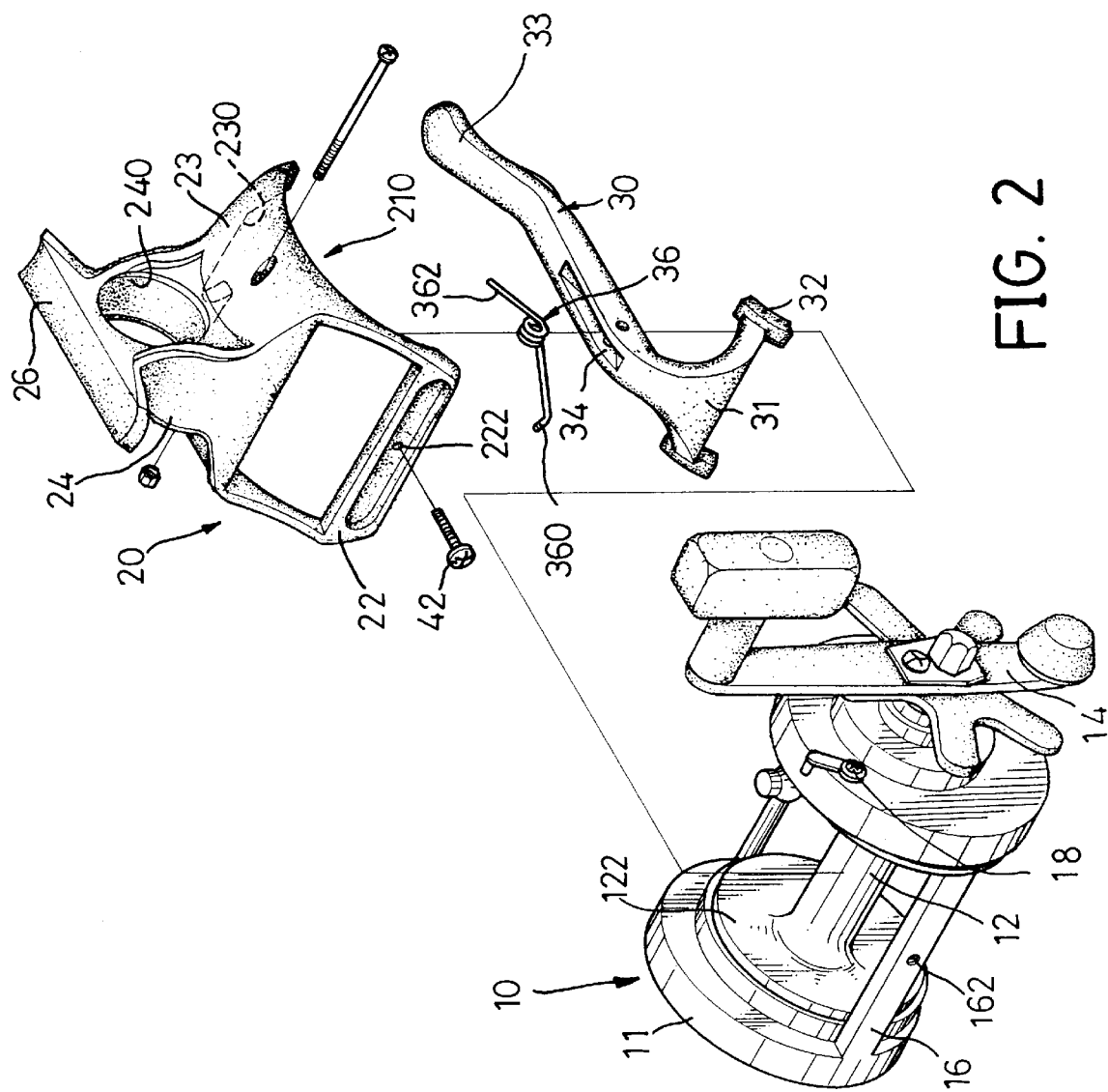
FIG. 2 is an exploded view of FIG. 1.
Figure 3:
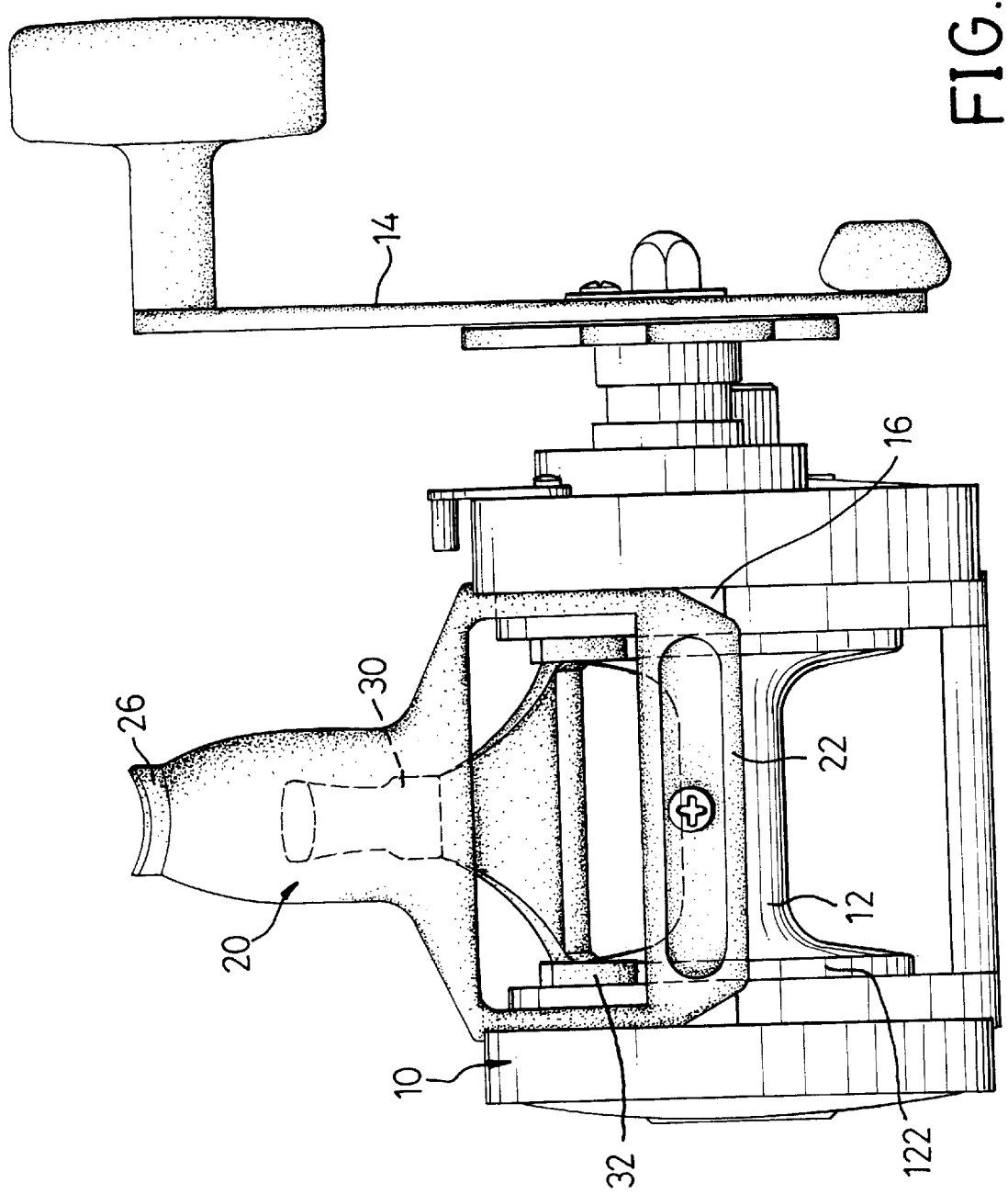
FIG. 3 is a front plan view of FIG. 1.
Figure 4:
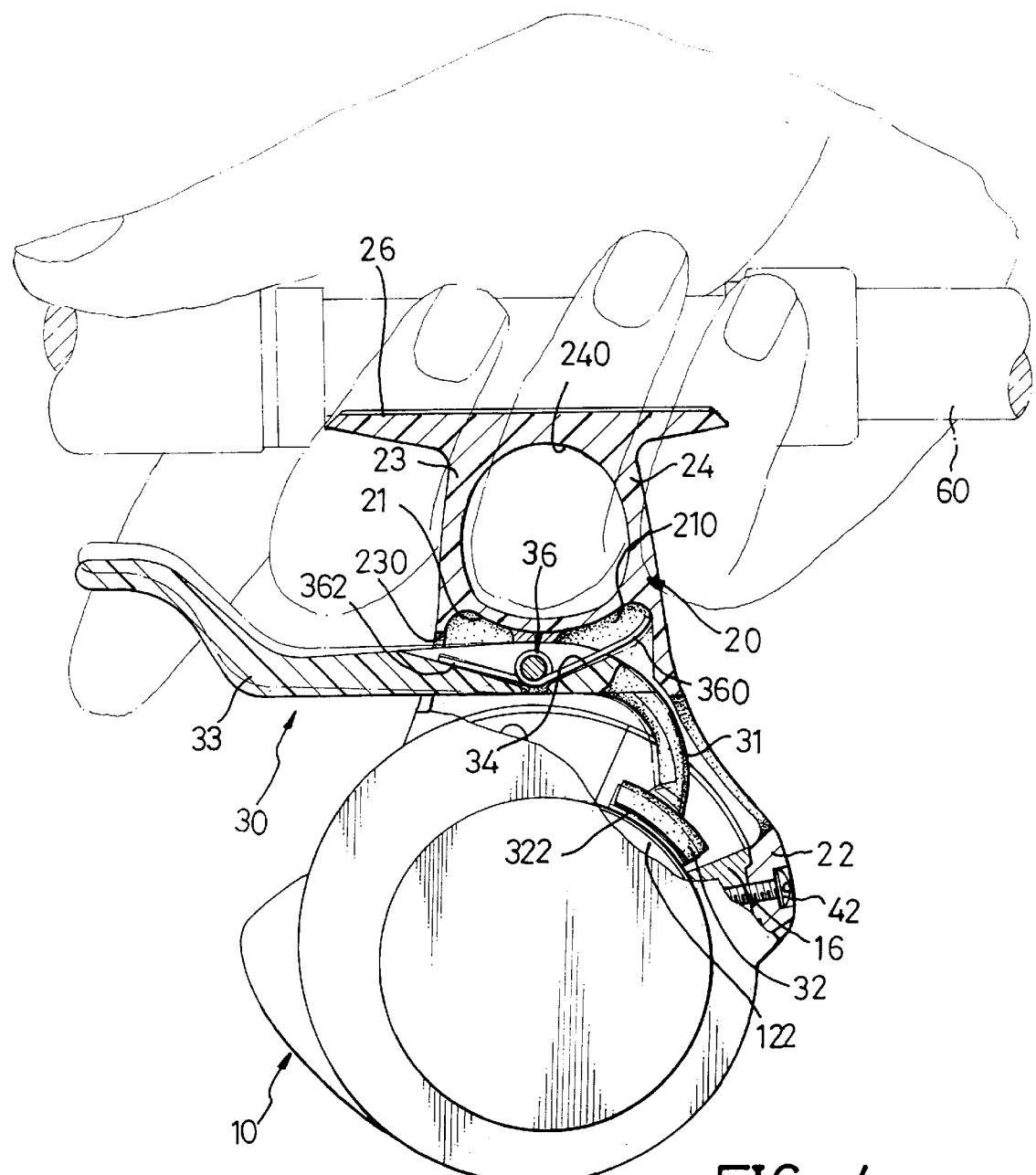
FIG. 4 is a partially side cross-sectional view of FIG. 1.

In operation, referring now to FIG. 4 with reference to FIGS. 1–3, a fishing rod 60 can be fitted on the assembly rack 26 such that a user can hold the fishing rod 60 in his hand, with one of his finger passing through the passage 240 and with another finger abutting on the second end portion 33 of the braking device 30 as shown in FIG. 4.

The anti-reverse lock 18 can be rotated to its first position, i.e., the spool 12 can be rotated freely such that a length of fishing line (not shown) wound around the spool 12 and guided by the fishing rod 60 can be drawn downwardly by a sinker (not shown) so as to be deeply immersed into the sea until the sinker reaches a required depth in the sea.

When the user wishes to stop a further travel of the fishing line, he can pull the second end portion 33 of the braking device 30 upwardly, thereby pivoting the braking device 30 such that each of the two braking pads 322 can be urged on the wheel 122 of the spool 12, thereby gradually decreasing the rotational velocity of the spool 12 so as to decrease the force exerted on the anti-reverse lock 18 by the spool 12 due to a large velocity of the fishing line such that the anti-reverse lock 18 can be easily rotated to its second position, thereby fully stopping the rotation of the spool 12.

The braking device 30 can be returned to its original position by the torsional spring 36 when the upward force exerted on the second end portion 33 of the braking device 30 is removed.

In addition, the fishing rod 60 can be held by the user with one of his fingers passing through the passage 240 such that the supporting bracket 20 together with the reel body 10 can be securely retained by the user even when the assembly rack 24 is detached from the fishing rod 60 due to a large force being exerted on the fishing rod 60 during fishing, thereby preventing the reel body 10 from being detached from the fishing rod 60.

It should be clear to those skilled in the art that further embodiments of the present invention may be made without departing from the scope and spirit of the present invention.

What is claimed is:

1. A fishing reel comprising:

a reel body having two spaced apart cylindrical gear housings;

a spool rotatably mounted in said reel body and including two end portions, each end portion vertically formed with a wheel to rotate therewith and rotatable received in one of said two cylindrical gear housings;

at least one connecting rib integrally mounted between said two cylindrical gear housings and defining a threaded hole therein;

a supporting bracket fixedly mounted on said reel body and including an inner wall defining a space therein, said supporting bracket including one end portion abutting said connecting rib and defining a bore aligning with said threaded hole;

a positioning bolt extending through said bore and said threaded hole for securing said supporting bracket on said reel body;

a braking device pivotally mounted in said space of said supporting bracket and including a first end portion formed with two braking arms each detachably abutting said wheel of each of said two end portions of said spool and a second end portion extending outwardly from said supporting bracket; and a torsional spring mounted between said supporting bracket and said braking device and including a first end urged on said inner wall of said supporting bracket and a second end urged on said second end portion of said braking device.

2. The fishing reel according to claim 1, wherein each of said two braking arms of said braking device has a braking pad mounted thereon.

3. The fishing reel according to claim 1, wherein said braking device includes a mediate portion defining a recess for receiving said torsional spring.

4. The fishing reel according to claim 1, wherein an elevated lug protrudes upwardly from a top portion of said supporting bracket and defines a passage therein.

5. The fishing reel according to claim 4, wherein an assembly rack is fixedly mounted on a top portion of said elevated lug and located above said passage.

\* \* \* \* \*